Dec. 17, 1940. K. TESSKY 2,225,489
DEVICE FOR DRESSING GRINDING TOOLS
Filed July 26, 1938 2 Sheets-Sheet 1
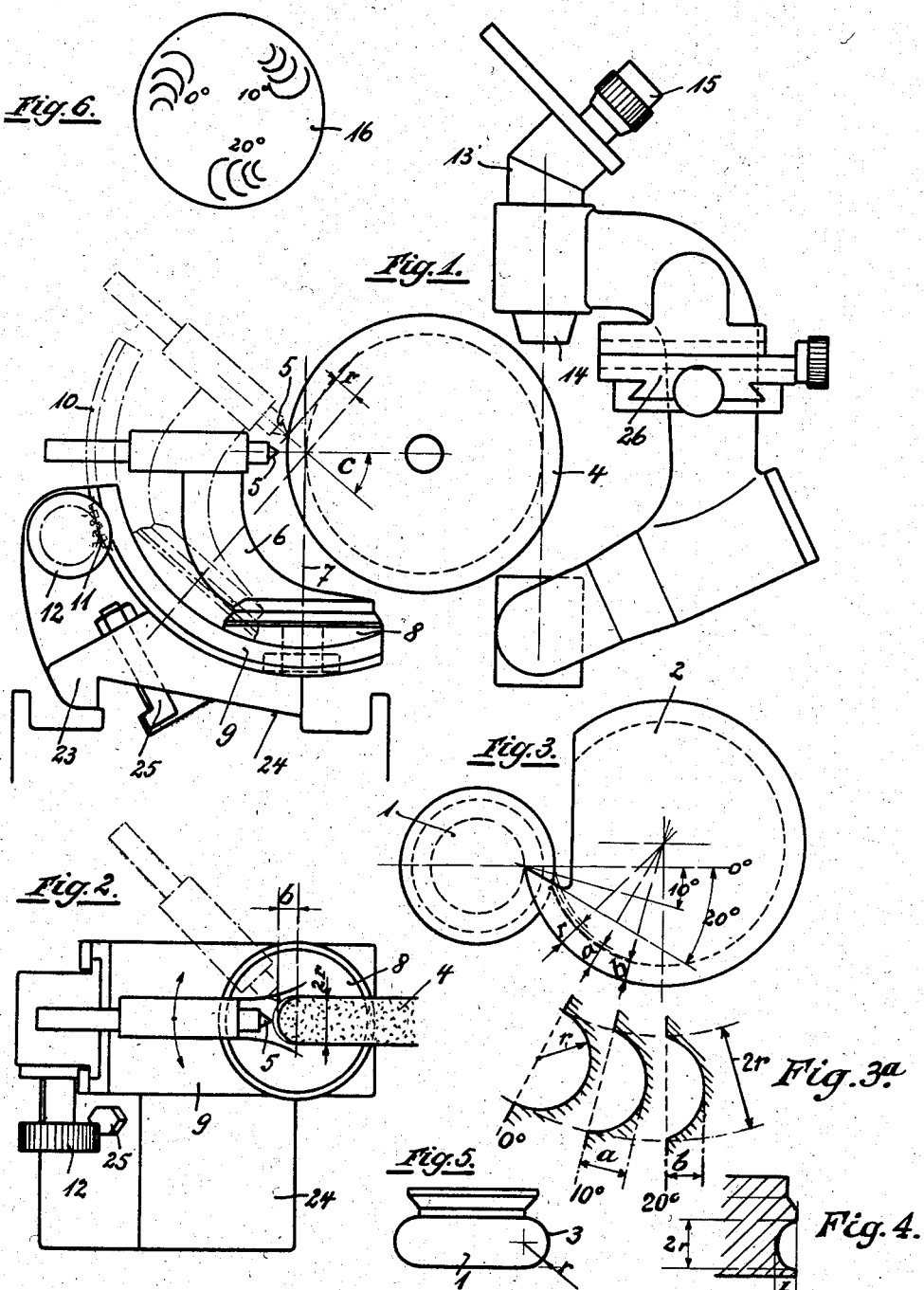
Inventor
Karl Tessky
by Michaelis & Michaelis
Attys.

Dec. 17, 1940.  K. TESSKY  2,225,489
DEVICE FOR DRESSING GRINDING TOOLS
Filed July 26, 1938  2 Sheets-Sheet 2
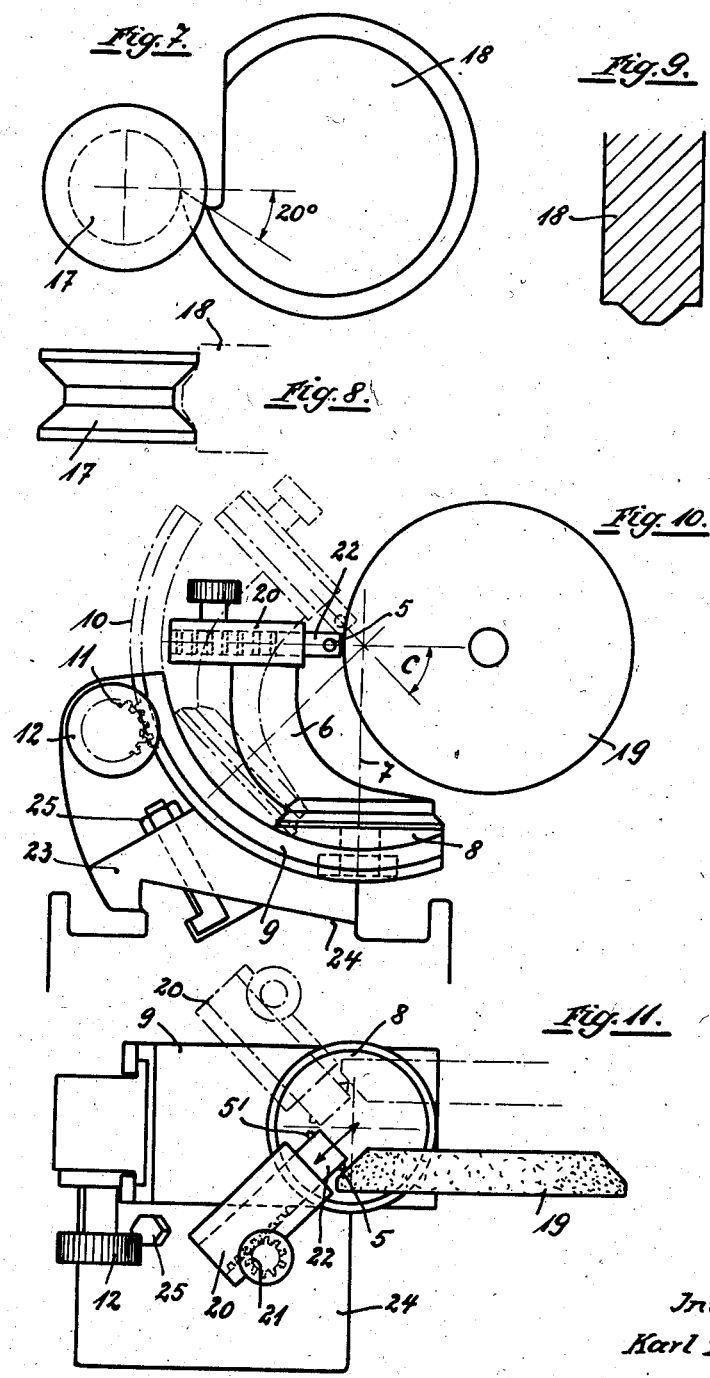
Inventor
Karl Tessky
by Michaelis & Michaelis
Attys.

Patented Dec. 17, 1940

2,225,489

UNITED STATES PATENT OFFICE 2,225,489

DEVICE FOR DRESSING GRINDING TOOLS

Karl Tessky, Esslingen-on-the-Neckar, Germany

Application July 26, 1938, Serial No. 221,316
In Germany July 29, 1937

2 Claims. (Cl. 125—11)

My invention relates to the production of tools serving to turn metal and other blanks, for instance on a lathe. It is more particularly concerned with a device for dressing the grinding wheels and other tools used in the production of profile cutters and countersinks.

In the machining of workpieces, for instance on lathes, more especially on a quantity production basis, there are mostly used so called circular forming tools, the circumference of which is formed in accordance with the shape of the workpiece to be produced, so that on the tool being re-ground, the configuration of its cutting edge remains unchanged.

If for instance workpieces consisting of brass yielding short cuttings, or of some other, less tough material shall be machined, the dressing of the circular forming tool does not encounter any particular difficulties, since in such a case the angle of action is 0°, so that the cutting face of the tool is directed towards the workpiece centre and approximately also the centre of the circular forming tool. In those cases the contour of the cutting edge of the tool is almost identical with the profile to be obtained on the workpiece and can therefore easily be produced in accordance therewith.

In contradistinction thereto a tough material such as soft steel, aluminium alloys, copper and the like requires a top rake angle which is materially greater than 0°. In that case a cutting edge formed in correspondence with the desired contour of the workpiece to be produced would cut a profile of materially different form, since owing to the slanting position of the cutting face the cutting profile is distorted correspondingly.

In order that the correct profile be produced in the workpiece, the cutting edge of the tool must have a materially different form and consequently the circular forming tool must be provided with a distorted profile, the form of which cannot easily be determined and produced, more especially in the case where circularly curved grooves or projecting portions, cam faces or noncylindrical faces and other curved forms shall be produced.

Hitherto, in order to produce such tools templates had to be made which agreed as exactly as possible with the surfaces to be produced and in which the distortion of the profile in correspondence to the predetermined top rake angle was taken into account. Not only the production of such templets, but also the manufacture of the tool (circular forming tool or the like) with their aid required much time and expense.

The apparatus according to this invention enables me to dress a tool such as a circular forming tool or the like with the greatest ease in such manner that also with a top rake angle of materially more than 0° any desired profile, for instance one of circular cross section can be produced on the workpiece with sufficient accuracy.

In order to readily obtain the required accuracy, this invention also enables me to carefully supervise the mode of production while shaping the tool.

This invention is mainly based on the idea of using, in the production of the distorted profile to be formed on the circular forming tool or the like, a grinding wheel, which was dressed with a tool, for instance a diamond, which was moved, during the dressing, in a line corresponding to the profile of the workpiece to be machined and in a plane which is inclined relative to the sectional middle plane of the grinding wheel in a dressing angle which depends on the top rake angle.

In the drawings affixed to this specification and forming part thereof two embodiments of my invention are illustrated diagrammatically by way of example.

In the drawings

Fig. 1 is a front elevation of one form of the apparatus.

Fig. 2 is a partial plan view corresponding to Fig. 1.

Fig. 3 is a plan view of a circular forming tool to be produced according to this invention, this tool being shown in operation on a workpiece, while Fig. 3a is a diagram explaining the distortion of the tool profile resulting in accordance with the top rake angle.

Fig. 4 is a partial cross section of a tool according to Fig. 3 and

Fig. 5 is an elevation of a workpiece producible with the aid of this tool.

Fig. 6 is a plan view of a master contour with distorted profiles for a measuring device to be used in connection with the new apparatus.

Fig. 7 is a plan view of a differently formed circular forming tool operating on the respective workpiece.

Fig. 8 being an elevation of this workpiece and

Fig. 9 a partial cross section of the tool.

Fig. 10 is an apparatus corresponding to the one shown in Fig. 1, but fitted out with an additional mechanism, for dressing the grinding wheel serving to produce the distorted profile for a circular forming tool according to Fig. 9, Fig. 11 being a plan view corresponding to Fig. 10.

Referring to the drawings and first to Figs. 3 and 5, 1 is a workpiece, on which a circular forming tool 2 shall form a face 3 of semi-circular cross section. If the top rake angle of the circular forming tool were equal to 0°, i. e. if the cutting face of the cutting edge of the tool were directed towards the centre of the workpiece 1, the profile of the cutting edge would also be approximately a semi-circle r such as shown in the bottom part of Fig. 3 in connection with the radial line pointing to 0°. On the other hand if the top rake angle were equal to 10°, the cutting edge should not be formed in accordance with a semi-circle, but should be flatter, resembling an ellipse. The apex of the curve should no more be =r, but smaller, =a, as shown in Fig. 3 in connection with the radial line marked 10°, for otherwise the middle portion of the cutting edge of the tool would have a greater apex than r and the work-piece would be formed with a larger outer diameter, but not with the desired semi-circular profile. Fig. 3 will make this clear beyond any doubt.

If the top rake angle is still larger, for instance as large as shown in Fig. 3 (20°), the apex of the curve formed by the cutting edge of the tool, and consequently also the apex of the profile groove to be ground in the tool must become still smaller, = b, in order that a semi-circular profile be produced on the workpiece. If projected on a plane corresponding to the top rake angle 0°, the profile of the tool has the form shown in Fig. 4.

According to this invention, in order to produce the tool profile distorted in accordance with the top rake angle when dressing the grinding wheel 4 (Fig. 1), which serves to grind the profilated groove into the circular forming tool 2, I move the dressing tool 5 (a diamond or the like) along a line which corresponds to the profile of the tool 1 to be machined by the circular forming tool, however in a plane which is inclined relative to the sectional middle plane of the grinding wheel at an angle c, which depends on the magnitude of the respective top rake angle, for instance an angle of 20°.

In Fig. 1 the dressing tool is shown in this position in dotted lines.

If a circular forming tool shall be ground for the machining of brass or the like yielding short cuttings, i. e. with a top rake angle of 0°, the dressing tool 5 for the grinding wheel 4 must be adjusted as shown in full lines in Fig. 1, so that its plane of motion coincides with a sectional middle plane of the grinding wheel. For the holder 6 of the dressing tool can be rotated about an axis 7 extending normally to that plane and can then be fixed in its position. The workpiece carrier 8 can be adjusted with the axis of rotation 7 in a plane extending through this axis and through the point of the dressing tool 5 vertically to the axis of the grinding wheel to be dressed, in a circular guide 9 of the carrier support 23 for the purpose of adjusting the carrier 8 to the dressing angle c required in each individual case. To this end the tool carrier 8 may be provided with a toothed segment 10 meshing with a gear 11 which can be rotated by means of the hand wheel 12 or the like. The support 23 can be displaced on a guide face 24 and fixed thereon by means of a screw 25. While Fig. 1 illustrates the displacement of the dressing tool in accordance with the change of the top rake angle, Fig. 2 illustrates the turning of the dressing tool about the axis 7.

The tool 5 can also be shifted longitudinally, in its carrier, beyond the axis 7, so that also hollow grooves can be produced in the grinding wheel.

As explained more in detail hereinafter, the dressing angle c for the turning out of the grinding wheel 4 is always larger than the top rake angle of the circular forming tool used in any individual case. Now since the turning-out angle c still depends to a certain extent from the diameter of the grinding wheel 4 and since it is besides difficult to adjust the dressing tool exactly to the radius of the circular curve to be produced on the workpiece, it is useful to combine with the dressing device according to Fig. 1 a measuring device which permits the correct dressing of the grinding wheel to be tested during operation in order to be able to correct the turning-out angle c, if this should prove desirable.

In the modification illustrated in the drawings the measuring device has the form of a measuring microscope 13 with lens 14 and ocular 15 which enables the profile of the grinding wheel produced by the dressing device to be inspected. This measuring microscope is preferably fitted in a manner known per se with exchangeable master contours 16 (Fig. 6), which, as indicated in the drawings by way of example, show profiles of semi-circles for different radii distorted corresponding to predetermined top rake angles at the circular forming tool, so that it is thus possible to test the distorted profile of the grinding wheel before the circular forming tool is ground.

These distorted semi-circular profiles on the master contour represent curves, in which the relation between the axes remains constant for any predetermined top rake angle of the circular forming tool, regardless of the radius. Thus for instance Fig. 12 shows a circular profile 27 of a workpiece 28, which shall be machined by means of a circular forming tool 29, the top rake angle of which is for instance 20°. As shown by the profile 30 of the circular forming tool, there corresponds, at a top rake angle of 20°, to one half of the longer axis r (in accordance with the corresponding curve on the master contour) an exactly predetermined apex b (one half of the smaller axis).

According to this invention this distorted profile is now produced on the grinding wheel by inclining the tool carrier 8 with the tool 5 so far relative to the sectional middle plane of the grinding wheel, until the smaller axis of the form produced by rocking the turning-out tool 5 in a circle, if measured in the radial direction of the grinding wheel, yields the value b. The dressing angle c resulting therefrom can be ascertained by calculation according to the equation, which contains, besides the two half axes r and b of the distorted semi-circle profile, also the radius R of the grinding wheel. If the dressing angle $c=180°-d$, then $$\cos d = \frac{f^2+g^2-e^2}{2fg}$$

or $$\cos d = \frac{r^2-2bR+b^2}{2r(R-b)}$$

While with a predetermined size of the profile, the two half axes are fixed on the master contour by a corresponding picture and thus represent unvariable values, the radius of the grinding wheel and in consequence thereof also the dressing angle c are variable. Thus for instance starting from a distorted profile with half axes of 8 and 10 mms., respectively and a radius of the grinding wheel R=100 mms. the dressing angle c is 38° 42', while with the same form and a radius of the grinding wheel of 80 mms. the dressing angle c is 39° 12'. By means of the master contour, arranged in the measuring device, with its profiles distorted in correspondence to the different top rake angles the dressed profile of the grinding wheel can be tested at any time, and if necessary be corrected in a simple manner by a corresponding variation of the dressing angle c by turning the hand wheel 12 of the dressing device.

A device constructed on the same principle as that shown in Figs. 1–6 can also be used in the manufacture of circular forming tools for the production of workpieces formed with cam faces of any desired angular position, i. e. with profiles in which circles are not, or not exclusively present.

In Figs. 7 and 8, 17 is a workpiece intended to be formed with such a profile. Fig. 8 shows in dot and dash lines the configuration which the circular forming tool 18 should have in order that the desired profile can be produced on the workpiece 17. Fig. 9, which is an axial section of the circular forming tool 18, illustrates its profile which may be examined and tested with the aid of the measuring microscope 13, 14, 15 (Fig. 1), a corresponding protractor being used for this purpose.

The dressing device according to Fig. 10 to be employed in the production of the grinding wheel 19 substantially corresponds to that shown in Fig. 1. However here there is also shown a mechanism for longitudinally displacing the dressing tool or tools, this mechanism consisting of a suitable guide 20 and pinion 21 which meshes with the rack 22 of the dressing tool carrier.

Fig. 11 further shows that the tool carrier 22 can also be rocked in a plane normal to the axis 7 in order that the dressing tools (diamonds) 5 and 5', which are arranged laterally on the carrier 22, can be set to the corresponding cone angles, as indicated in dot and dash lines in Fig. 11.

Preferably this dressing device is also arranged on a support 23 which can be displaced on the table 24 in parallel to the axis of the grinding wheel 19 to be turned out and can be fixed in position, for instance by means of screws 25.

The dressing device last described which serves for dressing conical faces and the like, may also be imparted, instead of the straight line movement of the tool holder, any desired curviform movement, for instance in a guide curve or the like, in order that also grinding wheels with curviform profiles can be dressed. The guide curve may in this case be formed with the profile to be produced on the workpiece, so that this guide curve can be produced comparatively easily and can also be used for any top rake angle.

The measuring microscope 13, 14, 15 according to Fig. 1 is also arranged, in a similar manner, preferably on a slide 26, and for displacement in parallel to the axis of the grinding wheel 4 to be ground, and for fixation, so that it can also be used for ascertaining the distances between the curves etc. produced and other faces or edges on the grinding wheel or on the circular forming tools and the like.

The measuring device (measuring microscope) 10 may also be fitted with a projection device, on the ground glass of which the profile measuring image of the grinding wheel and of the circular forming tool is visible on a larger scale. By means of such a projection device it is also possible to fix on the ground glass an enlarged sketch of the distorted profile corresponding to the top rake angle and drawn on transparent paper and to dress the grinding wheel in accordance with this profile drawing.

Obviously not only circular forming tools can be produced in accordance with this invention, but in a similar manner also backed-off profile cutters, profile countersinks and the like can be ground with the correct profile correlated to the corresponding top rake angle. In such a case, in addition to the rotatory movement required when grinding the profiles in circular forming tools, an additional corresponding backing-off movement will be necessary.

In a similar manner flat cutters for turning cylindrical workpieces and for backing-off profile cutters, profile countersinks and the like can be provided with a profile correlated to the corresponding top rake angle. In that case the grinding wheel or the cutter, instead of the rotatory movement required when grinding the profiles in circular forming tools, must be imparted a corresponding straight line movement. In the same manner also profile templets and the like can be produced with distorted profiles as required in each individual case.

Various changes may be made in the details disclosed in the foregoing specification without departing from the invention or sacrificing the advantages thereof.

I claim:

1. Dressing device for grinding wheels and the like used in the grinding of profile cutters, comprising in combination, a circular guide, a carrier arranged to be displaced in said guide in a plane normal to the axis of the grinding wheel to be dressed, the centre point of said guide being situated outside of said grinding wheel axis, a dressing toolholder arranged for angular movement relative to said carrier in a plane normal to the grinding wheel axis, and a dressing tool in said holder.

2. The device of claim 1, in which the dressing tool is arranged in said holder for axial displacement relative to said holder.

KARL TESSKY.